Patented Aug. 31, 1948

2,448,218

UNITED STATES PATENT OFFICE 2,448,218

MANUFACTURE OF PLASTER OF PARIS

Cuthbert Leslie Haddon, Newark-on-Trent, England, assignor to The British Plaster Board Limited, Wallasey, England, a British company No Drawing. Application November 18, 1943, Serial No. 510,801. In Great Britain December 17, 1942

3 Claims. (Cl. 106—111)

This invention relates to the manufacture of plaster of Paris, its object being to produce plaster of improved strength.

If ground gypsum or the precipitated dihydrate of calcium sulphate be heated in the presence of water in an autoclave at temperatures between 120° and 170° C., the product is the hemihydrate consisting of thin rod or needle shaped crystals which on drying and regauging with water to a creamy consistency, require so much water for gauging that the mechanical strength after setting is complete is not good. The above mentioned process has long been known, and reference may be made to the specifications of British Patents 3225/1903, 5853/1904 and 26,007/1903.

A great improvement was made by autoclaving lumps of gypsum around 120–125° C., drying and suitably regrinding and one such method is described in the U. S. Patent 1,901,051. A much smaller proportion of water is required for gauging the final product. The individual crystals are very much broader relative to their length than if the gypsum is first finely ground.

In some respects the manufacture of plaster is cheaper and more convenient when it proceeds from a basis of ground gypsum. One method of reducing the amount of water used for gauging is to autoclave in a 30 to 35% solution of magnesium sulphate and this is described in the U. S. Patent 1,989,712 of 1935. This method requires very careful washing of the final product, and large concentrations of magnesium sulphate.

In the process of my invention, I proceed from the basis of ground gypsum, adopting also the practice of autoclaving, that is to say effecting the partial dehydration in the presence of water, and under pressure.

It has long been known that various carboxylic acids, and the soluble salts thereof retard the setting of plaster (compare Gibson and Johnson J. S. C. 1, Jan. 22, 1932, vol. LI, No. 4, 25T–38T).

I have discovered that if the autoclaving of ground gypsum is performed in the presence of water in the liquid state and some of these carboxylic acids, and their soluble salts, a much squatter crystal of hemihydrate is obtained, and after rapidly filtering and drying (taking care to prevent setting as a result of permitting the solution to cool), much less water is required for gauging than if the gypsum were autoclaved in water only. The water required for gauging can be further reduced by suitable regrinding by methods known to the trade.

By autoclaving is meant heating in the presence of liquid water until the change from gypsum (or dehydrate) to hemihydrate (or anhydrous calcium sulphate) is complete.

The quantity of catalyst used is generally of the order of 0.1% by weight of the gypsum.

The carboxylic acids suitable for the process are those which contain at least two carboxyl groups separated by two carbon atoms, with the qualification that if a double bond occurs between the intervening carbon atoms the cis form (e. g. maleic acid) is suitable, but the trans form (e. g. fumaric acid) is not. Examples of acids which I have found particularly suitable for the process are succinic and citric acid, and very good results have also been obtained with maleic and malic acid. Other examples are dextro and meso-tartaric acid, racemic acid and aspartic acid.

The effect on the modification of crystal shape bears no direct qualitative relation to the retarding effect. Thus succinic acid has a most potent effect on the crystal shape produced by autoclaving, but is only a very mild retarder of setting, while tannic acids are powerful retarders, but exercise a much less powerful effect on the crystal shape.

Gypsum almost invariably contains sufficient carbonates as impurity to neutralise the organic acids added. The effect of the catalyst is much less in acid solution, and it is preferable to add sufficient carbonate to neutralise any free acid which may be present.

A high autoclaving temperature e. g. 160° C. produces a less squat crystal than if a lower temperature is employed, and is therefore undesirable. Under conditions where anhydrous calcium sulphate is also produced a high autoclaving temperature results in more of this constituent being produced.

In order to examine the efficiency of an organic material containing a carboxyl group, the following procedure is adopted.

Finely ground gypsum known to contain sufficient carbonate to produce a neutral solution is mixed with .2% of carboxylic acid (or a soluble salt of the acid, placed in a glass container and covered with water. The whole is heated in an autoclave with the temperature gradually rising from 125° C. to 140° C., for two hours. At the end of the experiment, the pressure is released, and the product is washed and dried. The product is then examined microscopically for the effect on crystal shape. If undecomposed gypsum is present, the experiment is repeated at 145° C. for two hours, but there are very few catalysts (e. g.

citric acid) which have so great a retarding action on the decomposition.

If the autoclaving is carried out in alkaline solution, e. g. with excess of lime the expansion on setting is lower, and very small needles of anhydrous calcium sulphate are produced at the same time. Although anhydrous calcium sulphate is chemically the stable phase at the temperature of autoclaving, yet in the absence of catalysts the meta-stable hemihydrate is always produced.

If lime is added in substantial excess of that required for neutralization the excess of lime increases the proportion of anhydrous calcium sulphate produced, though vigorous agitation during autoclaving helps the formation of hemihydrate. Thus with 1% hydrated lime and 0.05% citric acid in water, if the mixture is not agitated during autoclaving anhydrous calcium sulphate is almost entirely produced, but if the contents of the autoclave are well stirred, the product consists for the most part of hemihydrate crystals of squat shape.

Certain catalysts such as succinic acid produce squat crystals under all conditions, a coarser grind merely yielding larger crystals.

On the other hand, citric acid works more successfully with an initial fine grind, a greater proportion of anhydrous calcium sulphate being produced if the grind is coarser, i. e. contains many particles between 20 and 50 mesh.

The above mentioned catalysts are also efficient with ground plaster moulds or with precipitated gypsum, but a shorter autoclaving time and lower temperature is required. The crystals produced are of similar shape, but smaller than if raw gypsum is used.

The rate of change from gypsum to plaster in the presence of the catalysts is slower than if autoclaved in water alone.

Where the calcium salt of the catalyst is soluble, e. g. calcium succinate, the filtrate may be used again as a source of catalyst, as there appears to be little absorption of catalyst by the hemihydrate crystals.

The filtrate and washings may be concentrated to the former volume of liquid used, and a further small amount of catalyst added—of the order of 0.01% on the gypsum to be autoclaved—to make good the loss of catalyst not recovered.

Examples of the employment of succinic and citric acid are given below:

4 kilogrammes of minus 80 mesh gypsum, 5 litres of water, 20 grammes of hydrated lime and 2 grammes of citric acid were heated with stirring in an autoclave for 1½ hours at 130° C. At the end the pressure was released, and the product rapidly filtered and dried. Crystals of hemihydrate up to 30 microns long and 10 microns broad were obtained, together with some minute needles of anhydrous calcium sulphate.

A similar experiment except that the autoclaving was carried out at 150° C., resulted in a mixture of hemihydrate, and much more anhydrous calcium sulphate being obtained, i. e. too high a temperature was employed.

In a further experiment 4 kilogrammes of minus 80 mesh gypsum, 4 litres water, 2 grammes precipitated chalk and 4 grammes citric acid were similarly heated in an autoclave for 1 hour at 140° C. Hexagonal and squat crystals up to 30 microns broad were obtained.

5 kilogrammes of gypsum ground to pass a 20 mesh sieve, 4 litres of water, 5 grammes of succinic acid and 10 grammes of precipitated chalk were heated for 1 hour in an autoclave with stirring at 140° C. The product was filtered, washed and dried, and consisted of squat crystals up to 60 microns in length.

The filtrate was concentrated to 4 litres in volume and was mixed with 5 kilogrammes of gypsum with no further addition of catalyst. The mass was again autoclaved under like conditions and the final product consisted of squat crystals.

4 kilogrammes of old plaster moulds ground to pass a 20 mesh sieve, 4 litres of water, 4 grammes succinic acid and 2 grammes of citric acid were heated in an autoclave with stirring to 130° C. for 1 hour. The product was rapidly filtered and dried, and was found to consist of squat crystals up to 10 microns in length.

What I claim as my invention and desire to secure by Letters Patent of the United States is:

1. A process of producing plaster of Paris comprising mixing ground gypsum with water and a small proportion of a soluble aliphatic acid having in its molecule at least two carboxyl groups separated by two carbon atoms, with a single bond between intervening carbon atoms, heating the mixture thus obtained with agitation in a closed vessel at a temperature between 125° C. and 160° C. until the gypsum is converted into plaster of Paris consisting mainly of hemihydrate crystals of squat shape, the proportion of water being sufficient to maintain a liquid phase throughout the treatment.

2. A process of producing plaster of Paris comprising mixing ground gypsum with water and a small proportion of citric acid, heating the mixture thus obtained with agitation in a closed vessel at a temperature between 130° C. and 160° C. until the gypsum is converted into plaster of Paris consisting mainly of hemihydrate crystals of squat shape, the proportion of water being sufficient to maintain a liquid phase throughout the treatment.

3. A process of producing plaster of Paris comprising mixing ground gypsum with water and a small proportion of succinic acid, heating the mixture thus obtained with agitation in a closed vessel at a temperature between 125° C. and 160° C. until the gypsum is converted into plaster of Paris consisting mainly of hemihydrate crystals of squat shape, the proportion of water being sufficient to maintain a liquid phase throughout the treatment.

CUTHBERT LESLIE HADDON.

REFERENCES CITED

The following references are of record in the file of this patent:

UNITED STATES PATENTS

| Number | Name | Date |
|---|---|---|
| 437,140 | Sickler | Sept. 23, 1890 |
| 1,901,051 | Randel et al. | Mar. 14, 1933 |
| 2,067,762 | Hoggatt | Jan. 12, 1937 |
| 2,082,887 | Haydon | June 8, 1937 |

FOREIGN PATENTS

| Number | Country | Date |
|---|---|---|
| 5,853 | Great Britain | 1904 |